United States Patent [19]

Chanroo et al.

[11] Patent Number: 4,888,793
[45] Date of Patent: Dec. 19, 1989

[54] PHASE CORRECTING DPSK/PSK RECEIVER WITH DIGITALLY STORED PHASE CORRECTION DERIVED FROM RECEIVED DATA

[75] Inventors: Keith A. Chanroo, Coral Springs; Francis R. Steel, deceased, late of Parkland, both of Fla., by Lynne A. Steel, legal representative

[73] Assignee: Motorola, Inc., Schaumburg, Ill.

[21] Appl. No.: 190,904

[22] Filed: May 6, 1988

[51] Int. Cl.$^4$ .............................................. H03D 3/22
[52] U.S. Cl. ....................................... 375/84; 375/83; 329/306
[58] Field of Search ...................... 375/83, 84, 85, 86; 329/105, 110, 112, 124; 455/205, 214; 370/12

[56] References Cited

U.S. PATENT DOCUMENTS

| | | | |
|---|---|---|---|
| 3,675,139 | 7/1972 | Guest | 329/104 |
| 4,715,047 | 12/1987 | Hambley | 325/84 |
| 4,746,872 | 5/1988 | Yamagata | 375/84 |

*Primary Examiner*—Robert L. Griffin
*Assistant Examiner*—Stephen Chin
*Attorney, Agent, or Firm*—Nichols, Daniel K.

[57] ABSTRACT

A received phases modulated signal includes a plurality of information bits preceeded by three preamble bits. At periodic time intervals, approximately equal to one bit period, the receiver samples the signal and determines the phase angle of each bit at the sampling time. For the preamble bits, the receiver computes the phase error between the first and second preamble bits ($A_y - A_x$) and the phase error between the second and third preamble bits ($A_z - A_y$). An overall phase error (PE) is computed by taking the average of these two phase errors. To demodulate a DPSK signal, the average phase error (PE) is added to the phase angle ($A_i$) of the present information bit. This adjusted phase angle ($A_i'$) is then compared to the phase angle of the previous bit ($A_i - 1$) to demodulate the signal. To demodulate a PSK signal, the average phase error (PE) multiplied by D is added to the phase angle of the present information bit. This adjusted phase angle ($A_i'$) is compared to the phase angle ($A_r$) of a reference bit to demodulate the signal. D is the "distance"; i.e., the number of bits between the present information bit and reference bit.

12 Claims, 9 Drawing Sheets

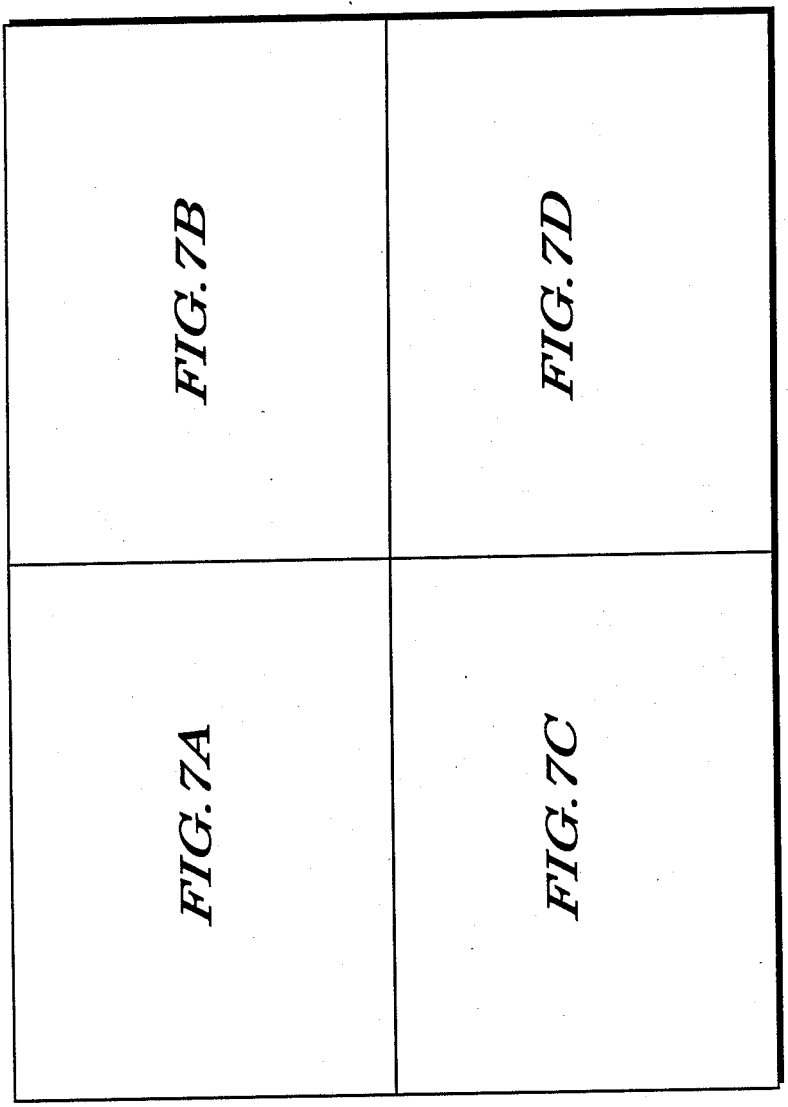

PHASE CORRECTING DPSK/PSK RECEIVER WITH DIGITALLY STORED PHASE CORRECTION DERIVED FROM RECEIVED DATA

BACKGROUND OF THE INVENTION

This invention pertains to radio receiver circuits and, more particularly, to a circuit for demodulating one or more phase modulated digital signals.

A conventional selective call radio paging system includes a base station transmitter and a plurality of portable selective call receivers, commonly called "pagers". The pagers are usually attached to an article of clothing worn by the user, and each pager includes a unique preprogrammed address code. The base station is typically connected to the public telephone system. To send a message to a particular pager, a caller dials the base station and, after indicating which pager is to receive the message, transmits the message to the base station over the telephone system. This message is typically a voice or digital message, such as the caller's telephone number. The base station then transmits the unique address code of the intended pager, followed by the message. Although all pagers in the system can receive the transmitted message, the message will be conveyed only to the user whose pager has the address code that matches the one transmitted by the base station. The message is typically conveyed to the user by way of a speaker or digital display.

The disadvantage of such a conventional paging system is that the user has no way to communicate back to the caller. In U.S. application Ser. No. 141,654, filed Jan. 7, 1988, however, an "acknowledge-back" or "ack-back" paging system is described in which brief communications from the pager to the base station and caller can occur.

The operation of such an ack-back paging system is illustrated in FIGS. 1 and 2. FIG. 1 is a timing diagram that illustrates how the "outbound" address and message are transmitted from the base station to the pager, and how the pagers transmit their individual "inbound" acknowledgement messages back to the base station. Referring to this figure, the base station first accumulates a plurality of "N" messages and corresponding addresses (N is typically 16 or 20). When N messages have been accumulated, the addresses that correspond to each of the N messages are sequentially transmitted, followed by the sequential transmission of the N messages. (A brief reference carrier burst is transmitted between the address and message blocks.) A predetermined time after the last outbound message is transmitted, all N pagers transmit acknowledgement messages back to the base station simultaneously, but on different frequency subbands. These subbands are illustrated in FIG. 2. Referring to this figure, the outbound addresses and messages, which are sequentially transmitted from the base station, occupy nearly the entire bandwidth of the channel. The inbound acknowledgement messages, which are simultaneously transmitted from each of the N pagers, are each transmitted on a separate frequency subband. For example, the pager that receives the first outbound message from the base station would transmit an inbound or "ackback message" on subband 1, the pager receiving the second outbound message would transmit an ack-back message on subband 2, etc., etc.

The problem introduced by such an unconventional paging system is that the base station receiver must simultaneously receive and demodulate N (again, N is typically 16 or 20) ack-back messages. Although the N ackback messages are transmitted "simultaneously", they are not precisely synchronized to one another. To receive and demodulate these N ack-back messages, a plurality of N asynchronous circuits could be used in the base station receiver. Some form of synchronous demodulation, however, would be preferred because of its theoretical superior performance in low signal to noise ratio environments. But the ack-back messages are typically very short, on the order of 7 or 10 bits. Thus, a conventional synchronous circuit that utilizes a phase locked loop (PLL) would be unsuitable to demodulate these brief ack-back messages because conventional PLL circuits require a predetermined period of time within which to acquire phase lock.

Accordingly, the invention described below provides for the pseudo-synchronous demodulation of N messages that may be simultaneously transmitted on different frequency subbands.

SUMMARY OF THE INVENTION

Briefly, the invention is a receiver for receiving a differential phase shift keyed (DPSK) modulated signal that includes a plurality of bits. Included is a receiver means for receiving the modulated signal. A phase angle means, which is coupled to the receiver means, determines a function of the phase angle of each bit of the modulated signal at predetermined time intervals. Phase error means for determining and storing a function of the phase error (PE) is coupled to the phase angle means. Phase error is a function of the difference between the phase angle ($A_x$) of a first bit and the phase angle ($A_y$) of a second bit. Demodulation means is coupled to the phase angle and phase error means. The demodulation means demodulates the signal by comparing the phase angle ($A_i$) of a selected information bit to the phase angle ($A_{i-1}$) of the previous bit of the modulated signal and by adjusting for the phase error.

In another embodiment, the invention is a receiver for receiving a phase shift keyed (PSK) modulated signal that includes a plurality of bits. Included are the receiver means, phase angle means, and phase error means described in the previous paragraph. Similarly, to demodulate the signal, a demodulation means is coupled to the phase angle means and to the phase error means. In this embodiment, however, the phase angle means compares the phase angle ($A_i$) of a selected information bit to the phase angle ($A_r$) of a reference bit and adjusts for D times the phase error. D is the number of bits separating the selected information bit from the reference bit.

BRIEF DESCRIPTION OF THE DRAWINGS

FIG. 7 is an illustration of the arrangement of FIGS. 7A-7D which collectively are a schematic diagram of a hardware embodiment of the DPSK demodulator of FIG. 5.

DESCRIPTION OF THE PREFERRED EMBODIMENT

Embodiments of the invention may be broken down into two categories. The first category includes embodiments that receive and demodulate differential phase shift keyed (DPSK) modulated signals. The second category, which is a variation of the first, includes embodiments of the invention that receive and demodulate phase shift keyed (PSK) modulated signals.

The preferred embodiments of the invention are intended to receive and demodulate short digital messages on the order of seven to ten bits of either DPSK or PSK modulated data. Messages of any length, however, may also be used. In the preferred embodiment, the first three bits of the message are identical in phase and constitute "preamble" bits. These preamble bits shall be referred to as $B_x$, $B_y$ and $B_z$. Although three preamble bits are preferred, the invention may be practiced with any number of preamble bits equal to or greater than two. Following the preamble are the "information" bits, which shall be referred to as $B_1$, $B_2$, $B_3$, etc., or, in general, $B_i$.

Although it is preferred that the preamble bits be identical in phase, this is not a limitation of the invention. In fact, the preamble bits may contain information (i.e., their phase or logical state may not be fixed), although an additional step is required in the demodulation process of the invention. This additional step will be discussed later.

In DPSK modulation, a change in phase between a selected bit and the previously transmitted bit is indicative of a particular logic state, while no change in phase is indicative of the opposite logic state. The convention used throughout this application is that a phase change indicates a logical 1, while no phase change indicates a logical 0. It should be understood, however, that this convention is entirely arbitrary and that, in all cases, the opposite convention may be used (i.e., a phase change indicates a logical 0, while no phase change indicates a logical 1).

In PSK modulation, the absolute phase of an information bit measured relative to some fixed reference determines the logical state of the received information bit. The convention used throughout this application is that a logical 0 is indicated when the phase of a selected bit is identical to the reference phase, while a logical 1 is indicated when these phases are different. As before, this convention is arbitrary, and, in all cases, the opposite convention may be used.

Theory of Operation

Figure 1:
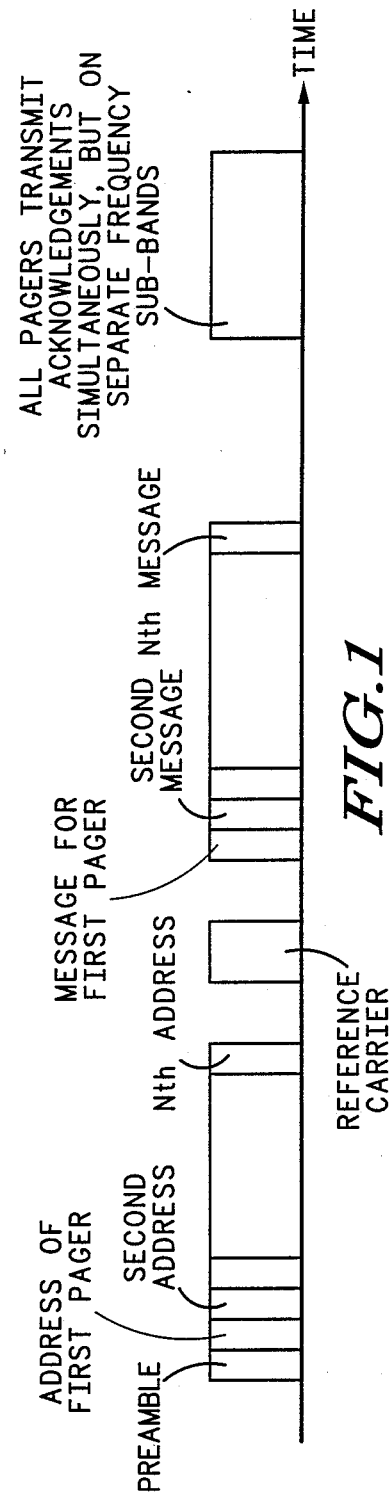
FIG. 1 is a timing diagram that illustrates the sequential transmission of N addresses and messages from the base station to the pagers, and the simultaneous transmission of N acknowledgement messages from the pagers back to the base station.
Figure 2:
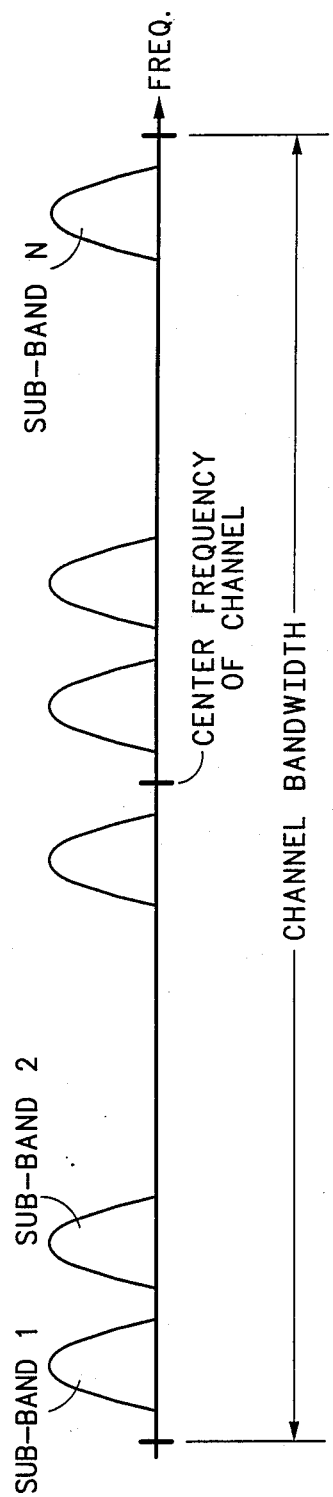
FIG. 2 is a frequency diagram of the radio frequency channel illustrating the N frequency subbands.
Figure 3:
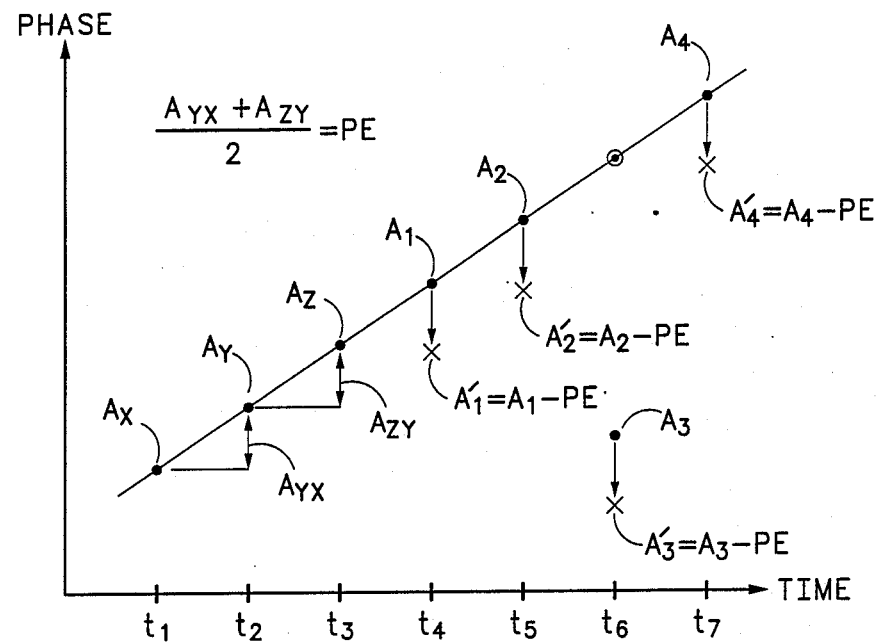
FIG. 3 is a plot of the instantaneous phase of a received DPSK signal as a function of time.

FIG. 3 is a plot of the instantaneous phase of a received DPSK signal as a function of time. Referring to this figure, the first bit $B_x$ of the preamble is sampled at time $t_1$ and its instantaneous phase angle is determined to be $A_x$. In a similar manner, bits $B_y$ and $B_z$ are sampled at times $t_2$ and $t_3$ and their instantaneous phase angles are determined to be $A_y$ and $A_z$, respectively. Ideally, the sampling of each bit of the received data occurs at precise periodic time intervals equal to the period of the received data, such that all preamble bits are sampled at the same phase angle (i.e., $A_x = A_y = A_z$). But the invention does not provide for the synchronization of the sampling rate to the received data, although their frequencies are approximately equal. Thus, a phase error usually exists between adjacent samples. For example, the phase error between the samples at times $t_1$ and $t_2$ is $A_y - A_x$ ($A_{yx}$), and the phase error between the samples at times $t_2$ and $t_3$ is $A_z - A_y$ ($A_{zy}$). In practice, there is usually a difference between these two phase errors so the invention computes an overall phase error (PE) for the preamble by taking the average of $A_{yx}$ and $A_{zy}$.

Next, the first information bit $B_1$ is received and sampled at time $t_4$ wherein its phase angle is determined to be $A_1$. To demodulate the first information bit, its phase angle $A_1$ is first adjusted by subtracting the average phase error (PE). Thus, the adjusted phase angle of bit $B_1$ is $A_1' = A_1 - PE$. The adjusted phase angle $A_1'$ is then compared to the phase angle of the previous bit $A_z$. If the phase angles are substantially the same ($-90° < A_1' - A_z' < 90°$), bit $B_1$ is a logical 0. If the phase angles are substantially different ($90° < A_1' - A_z < 270°$), bit $B_1$ is a logical 1.

This process is repeated for the remaining information bits. Briefly, the phase angle of each bit is first adjusted by subtracting the average phase error PE. The adjusted phase angle is then compared to the phase angle of the previous bit. A logical 0 is indicated if the adjusted phase angle is substantially identical to the phase angle of the previous bit, while a logical 1 is indicated if these two phase angles are substantially different.

At time $t_6$, an example is illustrated wherein a logical 1 is received. When bit $B_3$ is sampled at time $t_6$, its phase angle is determined to be $A_3$. $A_3$ is adjusted by subtracting the average phase error (PE) to obtain the adjusted phase $A_3'$. When $A_3'$ is compared to the phase angle of the previous bit, a difference of approximately 180° results, indicating that bit $B_3$ is a logical 1.

Figure 4:
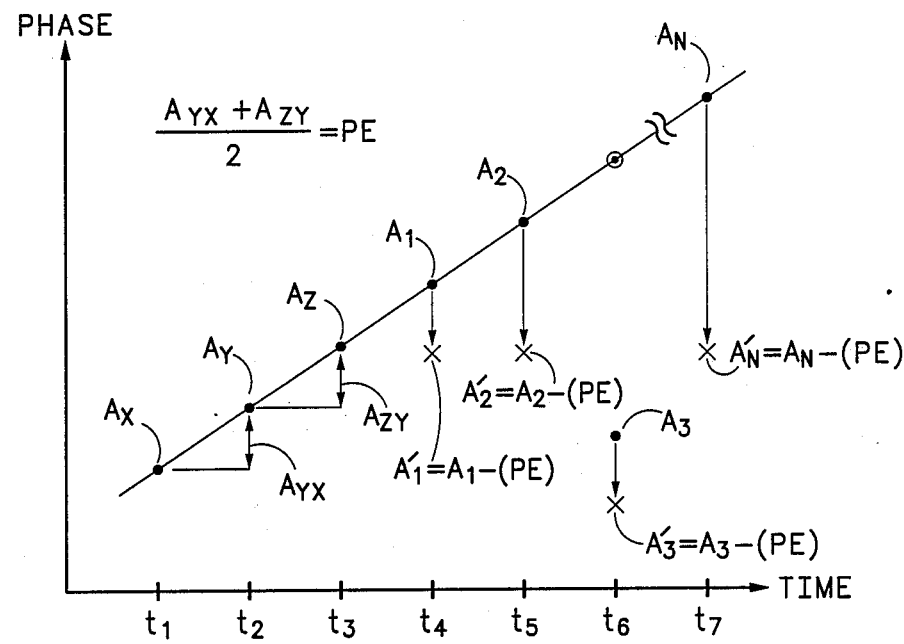
FIG. 4 is a plot of the instantaneous phase of a received PSK signal as a function of time.

FIG. 4 is a plot of the instantaneous phase of a received PSK signal versus time. Referring to this figure, the determination of the phase angles of the received bits at the sampling intervals $t_1$-$t_7$, and the calculation of the average phase error (PE) in the preamble are as described above with reference to DPSK demodulation. As previously discussed, PSK demodulation compares the phase of a selected information bit to some reference phase. In the example of FIG. 4, the reference phase angle $A_r$ is selected to be the phase angle $A_z$ of the third bit of the preamble.

To demodulate the information bits, the phase angle of the information bits are first adjusted by subtracting D times the average phase error (PE), wherein D is the "distance" from a selected information bit to the reference bit. For example, the second data bit $B_2$ is two bits (i.e., D=2) from the reference bit ($B_r$). Thus, the adjusted phase angle of bit $B_2$ is $A_2' = A_2 - 2(PE)$. Similarly, the adjusted phase angle of bit $B_3$ is $A_3'=A_3-3(PE)$. Each adjusted phase angle is then compared to the reference phase $A_r$. If the adjusted phase angle is substantially the same as the reference phase ($-90°<A_i'-A_r<90°$) a logical 0 is indicated; if the adjusted phase is substantially different ($90°<A_i'-A_r<270°$), a logical 1 is indicated.

As discussed above, the preamble bits may carry information, although an additional step is needed in the demodulation process. This additional step is an adjustment to the phase errors between adjacent preamble bits when these phase errors are within a specified range. More specifically, if $A_p$ and $A_{p-1}$ are the phase angles of adjacent preamble bits, then 180° will be added to the phase error $A_p-A_{p-1}$ if $90°<A_p-A_{p-1}<270°$. For example, when computing the adjusted phase error $A_{yx}'$ between the first two preamble bits, if $90°<A_y-A_x<270°$, then $A_{yx}'=A_y-A_x+180°$; otherwise, $A_{yx}'=A_y-A_x+0°$. The overall phase error (PE) is computed as the average of the adjusted phase errors. For example, if three preamble bits are transmitted, the overall phase error PE $=(A_{yx}'+A_{zy}')/2$, wherein $A_{yx}'$ and $A_{zy}'$ are the adjusted phase errors between the first and second, and the second and third preamble bits, respectively.

Block Diagram

Figure 5:
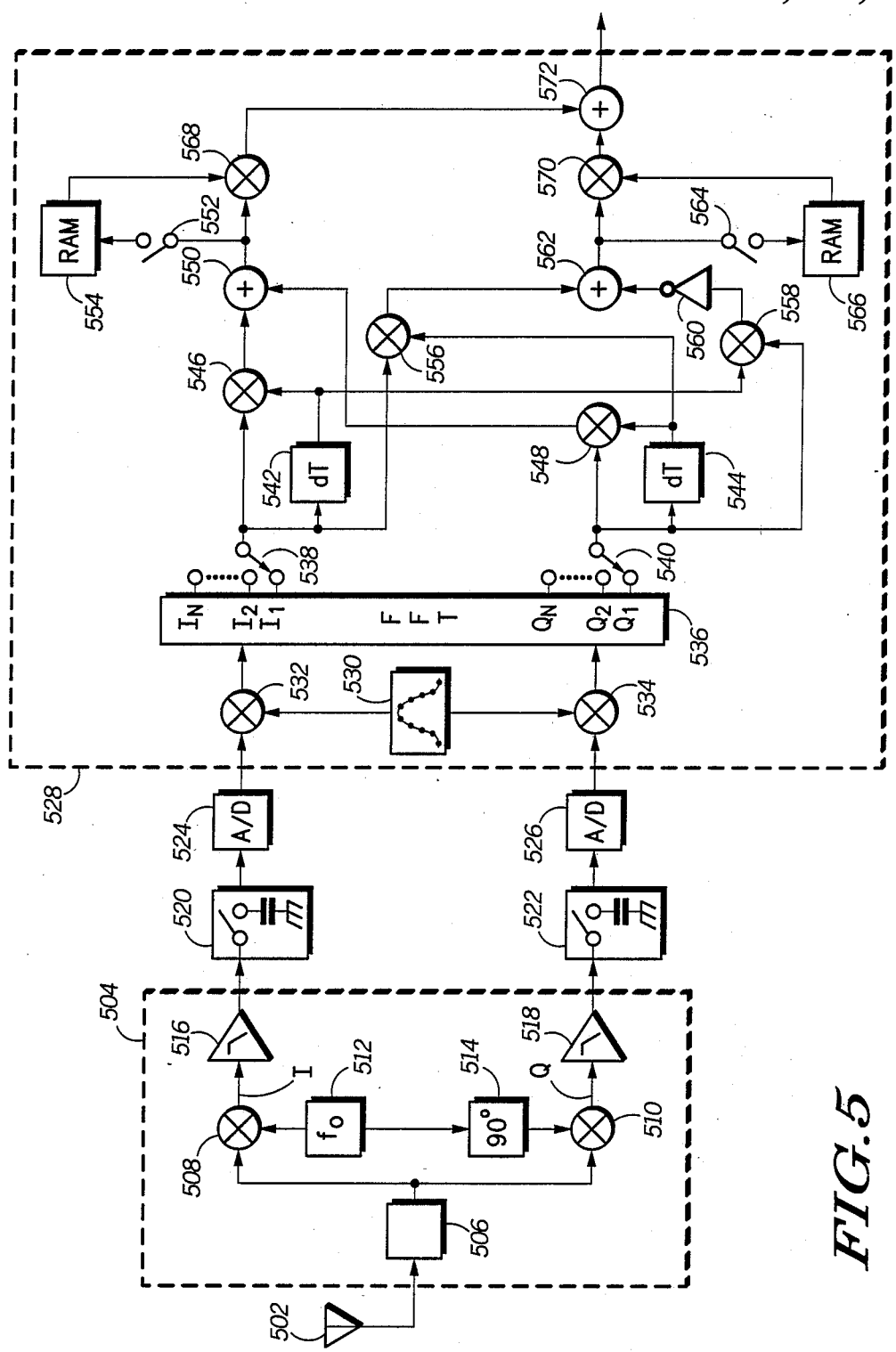
FIG. 5 is a block diagram of the preferred embodiment of the DPSK receiver and demodulator.

FIG. 5 is a block diagram of the preferred embodiment of the DPSK receiver and demodulator. This block diagram includes an analog of the signal processing that occurs in the digital signal processor (DSP). Referring to this figure, a transmitted signal is captured by the antenna 502 and conducted to a well known quadrature receiver 504. Quadrature receiver 504 includes a well known receiver front end 506, which may include RF amplifiers, mixers, local oscillators, filters, and other well known receiver circuits, The output of receiver front end 506 is an intermediate frequency signal which is mixed down to baseband by mixers 508 and 510, oscillator 512, and 90° phase shifter 514. The outputs of mixers 508 and 510 are, respectively, I and Q channel quadrature phase baseband signals. The I and Q channel signals are then filtered by low pass filters 516 and 518.

The I and Q channel outputs of filters 516 and 518 are then sampled by sample and hold circuits 520 and 522, and then digitized by analog to digital converters (A/D) 524 and 526. The digitized I and Q channels are then coupled to a digital signal processor (DSP) 528. The signal processing that occurs in DSP 528 is represented by conventional symbols and labeled blocks. It should be remembered, however, that these symbols and blocks are merely analogs of the signal processes that occur within the DSP.

In blocks 532 and 534, a weighting function 530 is multiplied by the sampled data in the I and Q channels. Next, a Fast Fourier Transform (FFT) is performed on the weighted data in the I and Q channels. Both the weighting function and the FFT are well known in the art and programs for performing these functions are commercially available.

The FFT block has I and Q channel output ports and each port has N outputs, wherein N is the number of subbands. The data that appears on each of the I channel outputs is a number that is indicative of the cosine of the phase angle of the present bit of the corresponding subband of the received message (cos A). Similarly, the data that appears on each of the Q channel outputs is a number that is indicative of the sine of the phase angle of the present bit of the corresponding subband of the received message (sin A).

The processing of the signal that is illustrated to the right of FFT block 536 is repeated for each of the N subbands. "Switches" 538 and 540 symbolize this sequential processing. In other words, switches 538 and 540 are set to subband 1 ($I_1$ and $Q_1$), the signal processing to the right of the switches is performed, then the switches are moved to subband 2 wherein the signal processing is repeated. This procedure is repeated until all N subbands have been demodulated. When the next set of N bits is received, the whole procedure is repeated until all message bits of all subbands have been demodulated.

In the alternative, weighting function 530, multipliers 532 and 534, and FFT block 536 can be replaced by N digital bandpass filters (for each of the I and Q channels), each of these filters being designed to pass a unique subband. The output of each of these filters is then down converted to its subband frequency baseband. Each subbandbaseband signal is then integrated over one bit period. The output of each of these integrators is a number which is indicative of the cosine and sine (cosine for the I channel and sine for the Q channel) of the phase angle of the present bit of the corresponding subband.

Processing which occurs to the right of switches 538 and 540 will now be described. There are two distinct processes that occur within these blocks; specifically, the calculation of the phase error and the demodulation of the information bits. The calculation of the phase error will be described first.

Recall that the cosine of the phase angle of the present bit of the selected subband appears at the common terminal of switch 538, while the sine of that angle appears at the common terminal of switch 540. Delay and storage blocks 542 and 544 store, respectively, the cosine and sine of the phase angle of the previously received bit of the selected subband. Thus, when the second bit $B_y$ of the preamble is being received, the cosine and sine of the previously received bit $B_x$ (cos $A_x$ and sin $A_x$) are stored in blocks 542 and 544, respectively Thus, upon receiving the second bit of the preamble, the output of multiplier blocks 546 and 548 are cos $A_y$ cos $A_x$, and sin $A_y$ sin $A_x$, respectively. These two functions are added in blocks 550 and the result is cos $A_y$ cos $A_x$ +sin $A_y$ sin $A_x$, which is equal to cos($A_y - A_x$). During reception of the preamble, switch 552 is closed and this result is stored in RAM block 554.

In a similar manner, the output of multiplier blocks 556 and 558 are cos $A_y$ sin $A_x$, and sin $A_y$ cos $A_x$, respectively. Block 562 sums the output of multiplier block 556 and the negative of the output of multiplier block 558 ("inverter" 560 causes a net subtraction to occur in summation block 562). The output of block 562 is cos $A_y$ sin $A_x$ - sin $A_y$ cos $A_x$, which is equal to -sin ($A_y - A_x$). Switch 564 is closed during the preamble reception and this result is stored in RAM block 566.

This process is repeated for the next preamble bit $B_z$ when the output of summation blocks 550 and 562 will be cos($A_z-A_y$) and -sin($A_z-A_y$), respectively. These values are also stored in RAM blocks 554 and 566. The average of the two numbers stored in RAM blocks 554 and 566 is then computed. Thus, the output of RAM block 554 is [cos($A_yA_x$) +cos ($A_z-A_y$)]/2, which is the cosine of the average phase error (cos PE). Similarly, the output of RAM block 566 is [sin($A_y-A_x$)+sin ($A_z$-

$-A_y)]/2$, which is the sine of the average phase error (sin PE). At the completion of the preamble, switches 552 and 564 are opened up and the calculated phase error remains fixed during the demodulation of the information bits.

Although it is preferred to take the average of the phase errors between three preamble bits, the average can be based on any number of preamble bits greater than two. In the alternative, no average need be taken and the phase error that's stored in RAM blocks 554 and 556 can simply be the phase error between two preamble bits.

During reception of the information bits, the output of summation blocks 550 will be: $\cos A_i \cos A_{i-1} + \sin A_i \sin A_{i-1}$, which is $\cos(A_i-A_{i-1})$. $A_i$ is the phase angle of the present information bit and $A_{i-1}$ is the phase angle of the previous information bit. (In the case of the first information bit, $A_{i-1}$ is the phase angle of the last preamble bit).

Similarly, the output of summation block 562 is:
$\sin A_{i-1} \cos A_i - \cos A_{i-1} \sin A_i$, which is $-\sin(A_i-A_{i-1})$.

The output of multiplier block 568 is then $\cos(A_i-A_{i-1}) \cos(PE)$ and the output of multiplier block 560 is $\sin(A_i-A_{i-1}) \sin (PE)$. These two functions are added in summation block 572. The output of block 572 is the demodulated signal. If this output is greater than 0, a logical 1 is indicated. If the output of summation block 572 is less than 0, a logical 0 is indicated. This process is repeated for each of the N subbands and for each of the information bits in the message.

Figure 6:
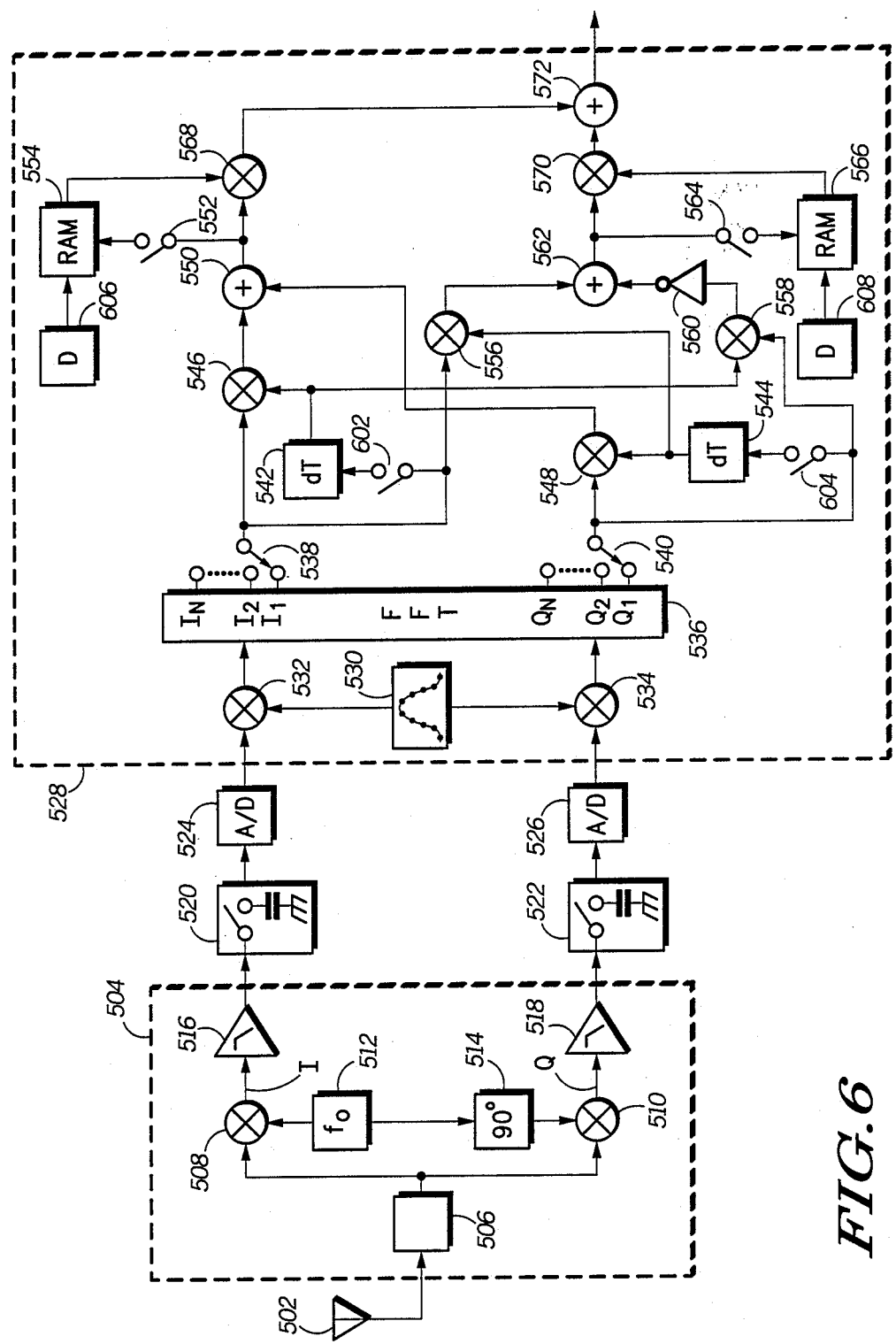
FIG. 6 is a block diagram of the preferred embodiment of the PSK receiver and demodulator.
Figure 7A:
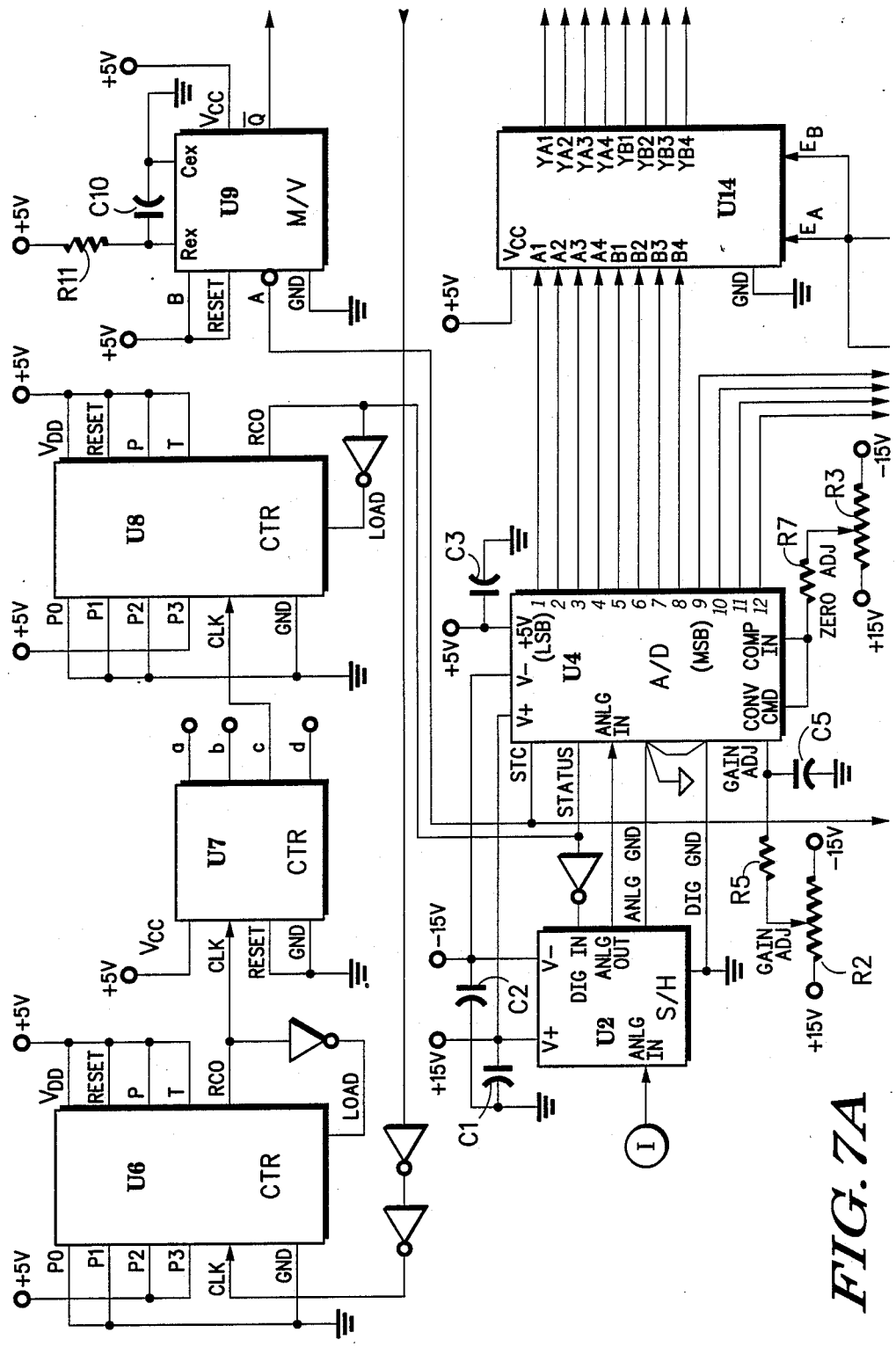
FIG. 7A is the upper left quadrant of the schematic diagram.
Figure 7B:
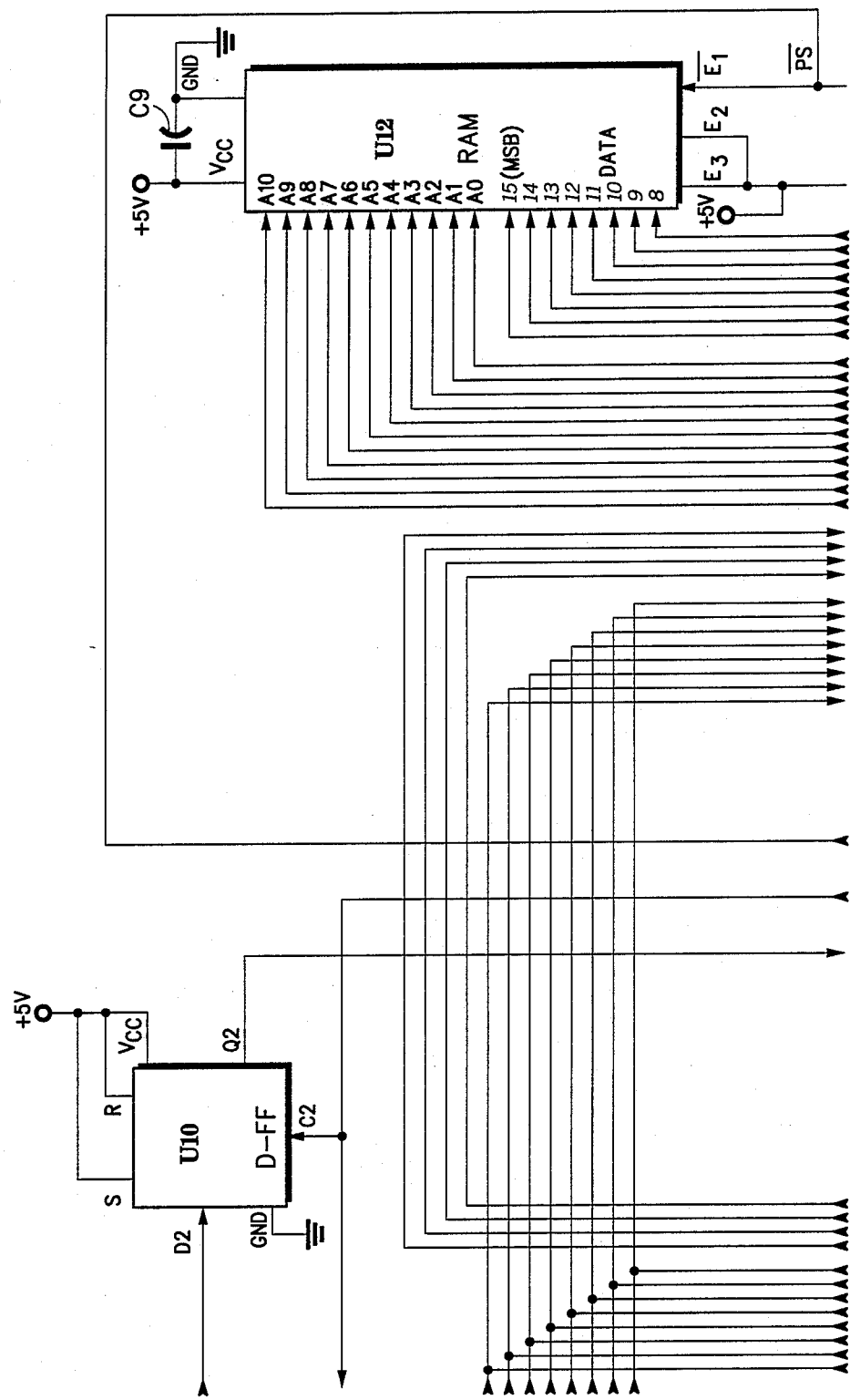
FIG. 7B is the upper right quadrant of the schematic diagram.
Figure 7D:
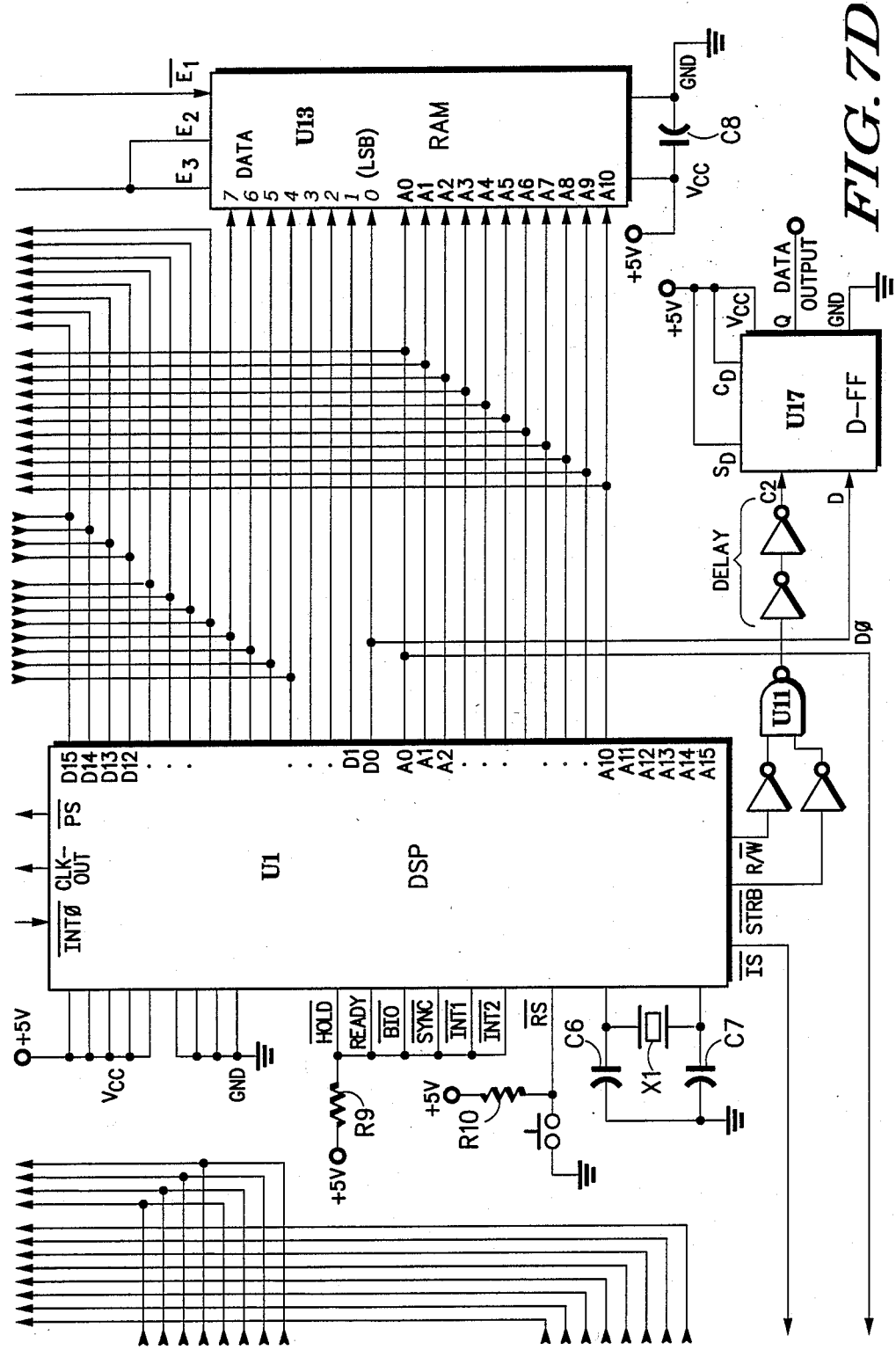
FIG. 7D is the lower right quadrant of the shcematic diagram.
Figure 7C:
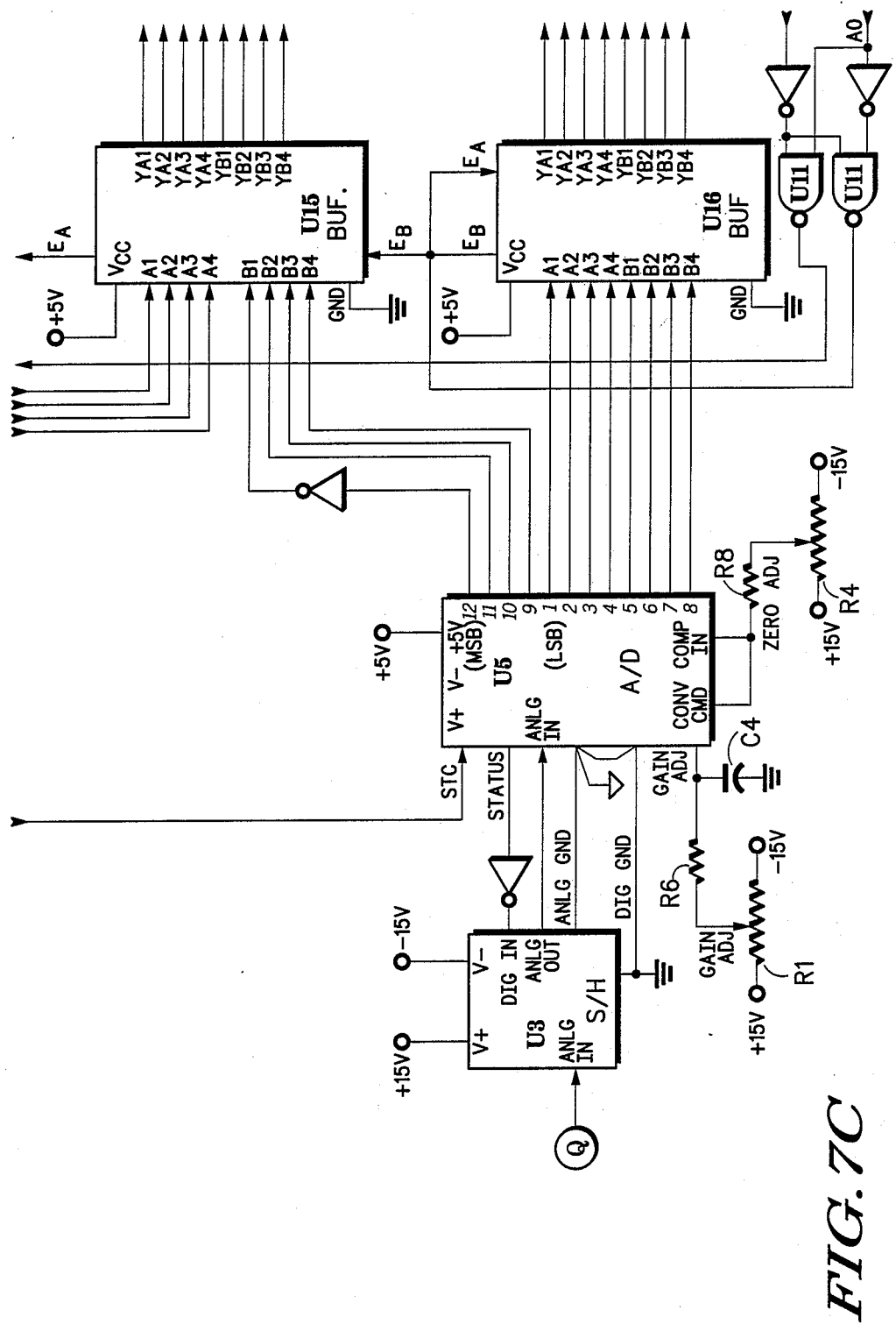
FIG. 7C is the lower left quadrant of the schematic diagram.

The PSK receiver and demodulator embodiment is illustrated in FIG. 6. There are two significant differences between this embodiment and the DPSK embodiment of FIG. 5. First, the PSK embodiment includes two additional "switches" 602 and 604. These switches are opened up after the reference bit $B_r$ is received. Thus, the output of delay and storage circuits 542 and 544 is the cosine of the phase angle of the reference bit (cos $A_r$) and the sine of the phase angle of the reference bit (sin $A_r$), respectively. In the example of FIG. 4, the reference bit was selected to be the last preamble bit $B_Z$. The phase error PE is computed as described with reference to FIG. 5. In the PSK embodiment, however, this phase error must be multiplied by D, wherein D is the distance between the current bit and the reference bit (see Theory of Operation, above). This multiplication is performed by blocks 606 and 608. Specifically, the following computation is performed by block 606: $\cos\{D \cos^{-1}[\cos(PE)]\}$; and in block 608: $\sin\{D \sin^{-1}[\sin(PE)]\}$.

Cosine and sine recurrence relationships involving multiples of angle PE can also be exploited, thus not requiring the inverse sine and cosine functions. The output of summation block 572 will be demodulated PSK data.

Hardware and Software

FIG. 7 is and FIGS. 7A-7D collectively are a schematic diagram of a hardware embodiment of the invention, and the corresponding part values and commercial part numbers are listed in Table 1. The software for the DSP is illustrated in Table 2. The program listed in Table 2 is designed to demodulate one subband. To demodulate N subbands, the programmer merely has to repeat the program N times for each subband. The FFT and weighting function are not included in this program since they are well known in the art and commercially available. It should be emphasized that FIG. 7, FIGS. 7A-7D and Table 2 merely illustrate one hardware embodiment of the invention and they are not intended to be limiting.

TABLE 1

| REFERENCE CHARACTER | DESCRIPTION |
|---|---|
| C1–C3 | 10 micro-Farads |
| C4–C5 | 0.01 micro-Farads |
| C6–C7 | 10 pico-Farads |
| C8–C9 | 1 micro-Farads |
| C10 | 106 pico-Farads |
| R1–R4 | 0–50 Kilo-Ohms |
| R5–R6 | 10 Meg-Ohms |
| R7–R8 | 1.8 Meg-Ohms |
| R9–R10 | 1 Kilo-Ohms |
| R11 | 5.8 Kilo-Ohms |
| U1 | Texas Instruments TMS 32020 |
| U2–U3 | Analog Devices AD346 Sample & Hold |
| U4–U5 | Analog Devices AD5240 A/D Converter |
| U6, U8 | 74HC161 counter |
| U7 | 74HC393 counter |
| U9 | 74LS123 multivibrator |
| U10 | 74LS74 "D"flip-flop |
| U11 | 74HC000 quad NAND gate |
| U12–U13 | Monolithic Memories MM063S1681N RAM |
| U14–U16 | 74HC244 buffer |
| U17 | 74HC74 "D" flip-flop |
| ALL INVERTERS | 74HC04 |

TABLE 2

```
0001 0000
0002           * DPSK MODULATION ALGORITHM WITH PHASE ERROR  CORECTION
0003           *
0004           *
0005           *
0006      0060 BITNUM  EQU 96
0007      0061 COUNT   EQU 97
0008      0062 ONE     EQU 98
0009           *
0010      0063 ISAMP   EQU 99
0011      0064 QSAMP   EQU 100
0012      0065 ISUM    EQU 101
0013      0066 TSUMI   EQU 102
0014      0067 QSUM    EQU 103
0015      0068 TSUMQ   EQU 104
0016           *
```

```
0017                  *
0018       0069  FAZI    EQU  105
0019       006A  TFAZI   EQU  106
0020       006B  FAZQ    EQU  107
0021       006C  TFAZQ   EQU  108
0022                  *
0023       006D  PHASEI  EQU  109
0024       006E  PHASEQ  EQU  110
0025                  *
0026       006F  MINUS   EQU  111
0027       0070  ZERO    EQU  112
0028       0071  THREE   EQU  113
0029       0072  NINE    EQU  114
0030       0073  TWO     EQU  115
0031       0074  THRTYA  EQU  116
0032       0075  PRMBLE  EQU  117
0033       0076  FIVE    EQU  118
0034       0077  TWENTY  EQU  119
0035                  *
0036 0000             AORG   >0
0037 0000 FF80  POWRUP  B    START           * INITIALIZATION ROUTIN
     0001 0060
0038 0002 FF80  INTRPT  B    INTSRV          * GO TO INTERRUPT SERVI
     0003 0107
0039                  *
0040 0020             AORG   >20
0041       0020  WINDOW  EQU  $
0042 0020 0000  COR00   DATA >0
0043 0021 0032  COR01   DATA >32
0044 0022 0064  COR02   DATA >64
0045 0023 00C8  COR03   DATA >C8
0046 0024 018F  COR04   DATA >18F
0047 0025 0252  COR05   DATA >252
0048 0026 030F  COR06   DATA >30F
0049 0027 03C5  COR07   DATA >3C5
0050 0028 0471  COR08   DATA >471
0051 0029 0513  COR09   DATA >513
0052 002A 05A8  COR10   DATA >5A8
0053 002B 062F  COR11   DATA >62F
0054 002C 06A6  COR12   DATA >6A6
0055 002D 070E  COR13   DATA >70E
0056 002E 0764  COR14   DATA >764
0057 002F 07A7  COR15   DATA >7A7
0058 0030 07D8  COR16   DATA >7D8
0059 0031 07F6  COR17   DATA >7F6
0060 0032 07FD  COR18   DATA >7FD
0061 0033 0800  COR19   DATA >800
0062 0034 0800  COR20   DATA >800
0063 0035 0800  COR21   DATA >800
0064 0036 0800  COR22   DATA >800
0065 0037 0800  COR23   DATA >800
0066 0038 0800  COR24   DATA >800
0067 0039 0800  COR25   DATA >800
0068 003A 0800  COR26   DATA >800
0069 003B 0800  COR27   DATA >800
0070 003C 0800  COR28   DATA >800
0071 003D 0800  COR29   DATA >800
0072 003E 0800  COR30   DATA >800
0073 003F 0800  COR31   DATA >800
0074 0040 0800  COR32   DATA >800
0075 0041 0800  COR33   DATA >800
0076 0042 0800  COR34   DATA >800
0077 0043 0800  COR35   DATA >800
0078 0044 0800  COR36   DATA >800
0079 0045 0800  COR37   DATA >800
0080 0046 0800  COR38   DATA >800
0081 0047 0800  COR39   DATA >800
0082 0048 0800  COR40   DATA >800
0083 0049 0800  COR41   DATA >800
```

```
0084 004A 0800   COR42   DATA    >800
0085 004B 0800   COR43   DATA    >800
0086 004C 0800   COR44   DATA    >800
0087 004D 07FD   COR45   DATA    >7FD
0088 004E 07F6   COR46   DATA    >7F6
0089 004F 07D8   COR47   DATA    >7D8
0090 0050 07A7   COR48   DATA    >7A7
0091 0051 0764   COR49   DATA    >764
0092 0052 070E   COR50   DATA    >70E
0093 0053 06A6   COR51   DATA    >6A6
0094 0054 062F   COR52   DATA    >62F
0095 0055 05A8   COR53   DATA    >5A8
0096 0056 0513   COR54   DATA    >513
0097 0057 0471   COR55   DATA    >471
0098 0058 03C5   COR56   DATA    >3C5
0099 0059 030F   COR57   DATA    >30F
0100 005A 0252   COR58   DATA    >252
0101 005B 018F   COR59   DATA    >18F
0102 005C 00C8   COR60   DATA    >C8
0103 005D 0064   COR61   DATA    >64
0104 005E 0032   COR62   DATA    >32
0105 005F 0000   COR63   DATA    >0
0106             *
0107 0060 CE01   START   DINT                    * DISABLE INTERRUPT MODE
0108 0061 C800           LDPK    0               * DATA PAGE ZERO
0109 0062 CE03           SOVM                    * SAVE OVERFLOW MODE
0110 0063 CE08           SPM     0
0111 0064 CE07           SSXM                    * SIGN EXTENSION MODE
0112 0065 558C           LARP    AR4             *
0113 0066 C404           LARK    AR4,4           * SETTING UP THE REQUIRE
0114 0067 D001           LALK    >FFC1           * MASK TO TURN ON ONLY
     0068 FFC1
0115 0069 6080           SACL    *               * INTERRUPT ZERO, INTO
0116 006A D000           LRLK    AR0,>200        * ADDRESS IN EXTERNAL ME
     006B 0200
0117 006C 5588           LARP    AR0
0118 006D CB3F           RPTK    63              * TRANSFER OF DATA FROM
0119 006E FCA0           BLKP    WINDOW,*+       * TO DATA MEMORY
     006F 0020
0120             *
0121 0070 CA09           LACK    >9              * INITIALIZE MEM TO CHEC
0122 0071 6072           SACL    NINE,0          * THE NUMBER OF BITS
0123 0072 CA03           LACK    >3              * MEM. LOC. TO CHECK FOR
0124 0073 6071           SACL    THREE,0         * THREE <-- 3
0125 0074 CA01           LACK    >1              * LOAD ACC IMMED. WITH 1
0126 0075 6062           SACL    ONE             * STORE 1 IN MEM LOC. ON
0127 0076 CA02           LACK    >2              * STORE IN MEM. LOC TWO
0128 0077 6073           SACL    TWO             * THE VALUE 2
0129 0078 CA00           ZAC                     * ZERO ACCUMULATOR
0130 0079 6070           SACL    ZERO,0          * ZERO <-- 0
0131 007A 1062           SUB     ONE
0132 007B 606F           SACL    MINUS,0         * MINUS CONTAINS (-1)
0133 007C CA3A           LACK    >3A
0134 007D 6074           SACL    THRTYA,0        * CONTAINS HEX 37 or 56
0135 007E CA05           LACK    >5
0136 007F 6076           SACL    FIVE,0
0137 0080 CA20           LACK    >20
0138 0081 6077           SACL    TWENTY,0
0139 0082 C300   ABOVE   LARK    AR3,0           * ZERO BIT COUNT
0140 0083 3470           LAR     AR4,ZERO        * LOAD AR4 WITH ZERO
0141 0084 CA00   OVER    ZAC
0142 0085 6065           SACL    ISUM,0          * LOAD ZERO IN ISUM
0143 0086 6067           SACL    QSUM,0          * LOAD ZERO IN QSUM
0144             *
0145 0087 D100           LRLK    AR1,>200        * LOAD AR1 WITH WINDOW F
     0088 0200
0146 0089 D200           LRLK    AR2,>3F         * USE AR2 TO COUNT # OF
     008A 003F
0147 008B 5589           LARP    1
```

```
0148 008C 3C80                LT      *                   * I.E.  128
0149 008D CE00   WAIT         EINT                        * ENABLE INTERRUPT &
0150 008E CE1F                IDLE                        * WAIT FOR INTERRUPT
0151                 * INTEGRATION OF THE BITS * ******* **** ******************
0152 008F 2C63                LAC     ISAMP,12            * SHIFT OUT THE LEAST FO
0153 0090 6863                SACH    ISAMP               * SIGNIFICANT BITS
0154 0091 2C64                LAC     QSAMP,12            * IN BOTH THE
0155 0092 6864                SACH    QSAMP               * I & Q SAMPLES
0156 0093 2065                LAC     ISUM                * ACC <-- PARTIAL INTEG.
0157 0094 5589                LARP    AR1                 * AR1 CURRENT AUXILIARY
0158 0095 3863                MPY     ISAMP               * P<-(WINDOWED ISAMP+PRE
0159 0096 3DA0                LTA     *+                  * ACC <-- P REG.
0160 0097 4865                ADDH    ISUM
0161 0098 F080                BV      PROBLM
     0099 0104
0162 009A 6865                SACH    ISUM,0              * SUMMATION OF I SAMPLES
0163 009B 2067                LAC     QSUM                * ACC <-- PARTIAL INTEG.
0164 009C 3864                MPY     QSAMP               * P<-(WINDOWED QSAMP+PRE
0165 009D 3D8A                LTA     *,2                 * ACC <-- P REG.
0166 009E 4867                ADDH    QSUM
0167 009F F080                BV      PROBLM
     00A0 0104
0168 00A1 6867                SACH    QSUM,0              * SUMMATION OF Q SAMPLES
0169 00A2 7275                SAR     AR2,PRMBLE          ***
0170 00A3 2075                LAC     PRMBLE              * CHECK THE 1st 8 SAMPL
0171 00A4 1074                SUB     THRTYA              * SEE IF SYSTEM IN PREA
0172 00A5 F580                BNZ     SITE                ***
     00A6 00A9
0173 00A7 FF80                B       SLIP
     00A8 00B5
0174 00A9 7275   SITE         SAR     AR2,PRMBLE
0175 00AA 2075                LAC     PRMBLE
0176 00AB 1076                SUB     FIVE
0177 00AC F580                BNZ     HOP
     00AD 00B0
0178 00AE FF80                B       SLIP
     00AF 00B5
0179 00B0 7275   HOP          SAR     AR2,PRMBLE
0180 00B1 2075                LAC     PRMBLE
0181 00B2 1077                SUB     TWENTY
0182 00B3 F580                BNZ     SKIP
     00B4 00BD
0183 00B5 7361   SLIP         SAR     AR3,COUNT           * FIRST THREE BIT ARE  H
0184 00B6 2061                LAC     COUNT,0             * (ONES)   IF NOT THEN ZE
0185 00B7 1071                SUB     THREE               * BIT COUNT AND START AL
0186 00B8 F480                BGEZ    SKIP                * WHEN THE FIRST THREE B
     00B9 00BD
0187 00BA 2065                LAC     ISUM,0              * ARE ONES THEN THE RECE
0188 00BB F280                BLEZ    ABOVE               * IS IN PREAMBLE.
     00BC 0082
0189 00BD FB90   SKIP         BANZ    WAIT                * BRANCH TO WAIT # SAMPL
     00BE 008D
0190                 *
0191 00BF 558B                LARP    3                   * CHECK IF SYSTEM IS
0192 00C0 55A0                MAR     *+                  * IN PREAMBLE  I.E.  IF
0193 00C1 558C   BELOW        LARP    AR4
0194 00C2 7460                SAR     AR4,BITNUM
0195 00C3 2060                LAC     BITNUM,0            * ACC <- 0
0196 00C4 1062                SUB     ONE
0197 00C5 F4A0                BGEZ    DELAY,*+
     00C6 00CB
0198 00C7 5665                DMOV    ISUM                * STORE ISUM INTO TSUMI
0199 00C8 5667                DMOV    QSUM                * STORE QSUM INTO TSUMQ
0200 00C9 FF80                B       OVER                * WAIT FOR INTERRUPT
     00CA 0084
0201 00CB 3C66   DELAY        LT      TSUMI               * LOAD T REG. WITH 1ST S
0202 00CC 3865                MPY     ISUM                * MULTIPLY BY 2ND SAMPLE
0203 00CD CA00                ZAC                         * ZERO ACC.
0204 00CE 3D68                LTA     TSUMQ               * ACC <-(P REG): T REG <
```

```
0205 00CF 3867           MPY      QSUM              * P <--(TSUMQ * QSUM)
0206 00D0 3D66           LTA      TSUMI             * ACC <-(ACC + P):T REG
0207 00D1 6869           SACH     FAZI,0            * FAZI <-(TSUMI*ISUM+TSU
0208 00D2 3867           MPY      QSUM              * P <-(TSUMI * QSUM)
0209 00D3 CA00           ZAC                        * ZERO ACC.
0210 00D4 3D68           LTA      TSUMQ             * ACC <-(TSUMQ*ISUM):T R
0211 00D5 CE23           NEG                        * ACC <- (-ACC)
0212 00D6 3865           MPY      ISUM              * P REG <- (TSUMI + QSUM
0213 00D7 CE15           APAC                       * ACC <- ( ACC + P - REG
0214 00D8 686B           SACH     FAZQ,0            * FAZQ <-(TSUMI*QSUM-TSU
0215 00D9 5665           DMOV     ISUM              * STORE ISUM IN TEMP LOC
0216 00DA 5667           DMOV     QSUM              * STORE QSUM IN TEMP LOC
0217 00DB 2060           LAC      BITNUM,0          * LOAD ACC WITH BIT CHEC
0218 00DC 1062           SUB      ONE
0219 00DD F580           BNZ      PHERR             * CHECK IF BIT # IS 2
     00DE 00E3
0220 00DF 5669           DMOV     FAZI              * STORE FAZI IN TEMP LOC
0221 00E0 566B           DMOV     FAZQ              * STORE FAZQ IN TEMP LOC
0222 00E1 FF80           B        OVER              * RETURN TO WAIT FOR INT
     00E2 0084
0223 00E3 2060   PHERR   LAC      BITNUM,0          * ACC <- ( AR4)
0224 00E4 1073           SUB      TWO
0225 00E5 F580           BNZ      ACK
     00E6 00F2
0226 00E7 2F69           LAC      FAZI,15           * DIVIDE BY TWO
0227 00E8 2F6A           LAC      TFAZI,15          * LOAD ACC WITH (TFAZI)
0228 00E9 4869           ADDH     FAZI              * ACC <- (TFAZI + FAZI)
0229 00EA 686D           SACH     PHASEI            * STORE I CHANNEL PHASE
0230           *
0231 00EB 2F6B           LAC      FAZQ,15           * DIVIDE BY TWO
0232 00EC 686B           SACH     FAZQ
0233 00ED 2F6C           LAC      TFAZQ,15          * LOAD ACC WITH (TFAZQ)
0234 00EE 486B           ADDH     FAZQ              * ACC <- TFAZQ + FAZQ
0235 00EF 686E           SACH     PHASEQ            * STORE Q CHANNEL PHASE
0236 00F0 FF80           B        OVER
     00F1 0084
0237 00F2 CA00   ACK     ZAC                        * ZERO ACC
0238 00F3 3C6D           LT       PHASEI            * T REG <-(PHASEI) FOR
0239 00F4 3869           MPY      FAZI              * MULTIPLICATION WITH FA
0240 00F5 3D6E           LTA      PHASEQ            * ACC <-(PHASEI*FAZI):T
0241 00F6 386B           MPY      FAZQ              * FOR MULTIPLICATION WIT
0242 00F7 CE15           APAC                       * ACC <-(FAZI*PHASEI+FAZ
0243 00F8 F280           BLEZ     LOWBIT            * CHECK FOR PHASE CHANGE
     00F9 00FD
0244 00FA E062           OUT      ONE,0             * OUTPUT NO PHASE CHANGE
0245 00FB FF80           B        CHECKB            * RETURN TO WAIT INTERRU
     00FC 00FE
0246 00FD E070   LOWBIT  OUT      ZERO,0            * OUTPUT 180 DEG PHASE C
0247 00FE 2061   CHECKB  LAC      COUNT,0           * CHECK TO SEE IF ALL TE
0248 00FF 1072           SUB      NINE              * OF DATA ARE IN & IF S
0249 0100 F680           BZ       ABOVE             * RESET AND SEARCH FOR P
     0101 0082
0250 0102 FF80           B        OVER              * BITS.
     0103 0084
0251 0104 E072   PROBLM  OUT      NINE,0
0252 0105 FF80           B        OVER
     0106 0084
0253           * ------------------------------------------------------------
0254 ·         *
0255           * INTERRUPT SERVICE ROUTINE ----------------------------------
0256           *
0257 0107 8163   INTSRV  IN       ISAMP,1           * INPUT I DATA SAMPLE
0258 0108 8064           IN       QSAMP,0           * INPUT Q DATA SAMPLE
0259           *
0260 0109 CE26           RET
0261           * ------------------------------------------------------------
0262RORS, NO WARNINGS  END
```

We claim as our invention:

1. A receiver, for receiving a DPSK modulated signal that includes a plurality of preamble bits and a plurality of information bits, said receiver comprising in combination:

receiver means for receiving said modulated signal;

phase angle means, coupled to said receiver means, for determining a function of the phase angle of each bit of said modulated signal at periodic time intervals;

phase error means, coupled to said phase angle means, for determining and storing a function of the phase error (PE), said phase error being a function of the difference between the phase angle ($A_x$) of a first bit and the phase angle ($A_y$) of a second bit of said preamble bits of the modulated signal; and demodulation means, coupled to said phase angle and said phase error means, for demodulating said signal by comparing the phase angle ($A_i$) of a selected information bit (l) to the phase angle ($A_{i-1}$) of the previous bit (l-1) of the modulated signal, and by adjusting for said phase error 2. A receiver, for receiving a DPSK modulated signal that includes a plurality of bits, said receiver comprising in combination;

receiver means for receiving said modulated signal;

phase angle means, coupled to said receiver means, for determining a function of the phase angle of each bit of said modulated signal at periodic time intervals;

phase error means, coupled to said phase angle means, for determining and storing a function of the phase error (PE), said phase error being a function of the difference between the phase angle (Ax) of a first bit and the phase angle (Ay) of a second bit of said modulated signal; and demodulation means, coupled to said phase angle and said phase error means, for demodulating said signal by comparing the phase angle (Ai) of a selected information bit (l) to the phase angle (Ai-1) of the previous bit (l-1) of the modulated signal, and by adjusting for said phase error;

said demodulation means including means for calculating:

$$\cos(A_i - A_{i-1}) \cos(PE) + \sin(A_i - A_{i-1}) \sin(PE),$$

the result of which is indicative of the logical state of bit l.

3. The receiver of claim 2, wherein said demodulation means includes:

means for calculating: $\cos A_i \cos A_{i-1} + \sin A_i \sin A_{i-1}$, the result of which is $\cos(A_i - A_{i-1})$; and means for calculating: $\sin A_{i-1} \cos A_i - \cos A_{i-1} \sin A_i$, the result of which is $-\sin(A_i - A_{i-1})$.

4. The receiver of claim 3, wherein said phase error means includes:

means for calculating: $\cos A_y \cos A_x + \sin A_y \sin A_x$, the result of which is $\cos(A_y - A_x)$; and means for calculating: $\sin A_x \cos A_y - \cos A_x \sin A_y$, the result of which is $-\sin(A_y - A_x)$.

5. The receiver of claim 2, wherein said phase error means includes:

means for calculating: $\cos A_y \cos A_x + \sin A_y \sin A_x$, the result of which is $\cos(A_y - A_x)$; and means for calculating: $\sin A_x \cos A_y - \cos A_x \sin A_y$, the result of which is $-\sin(A_y - A_x)$.

6. A receiver, for receiving a PSK modulated signal that includes a plurality of preamble bits and a plurality of information bits, said receiver comprising in combination:

receiver means for receiving said modulated signal;

phase angle means, coupled to said receiver means, for determining a function of the phase angle of each bit of said modulated signal at periodic time intervals;

phase error means, coupled to said phase angle means, for determining and storing a function of the phase error (PE), said phase error being the difference between the phase angle ($A_x$) of a first bit and the phase angle ($A_y$) of a second bit of said preamble bits of the modulated signal; and demodulation means, coupled to said phase angle and phase error means, for demodulating said signal by comparing the phase angle ($A_i$) of a selected information bit (l) to the phase angle ($A_r$) of a reference bit and by adjusting for D times the phase error, wherein D is the number of bits separating the selected information bit from the reference bit.

7. A receiver, for receiving a PSK modulated signal that includes a plurality of bits, said receiver comprising in combination;

receiver means for receiving said modulated signal;

phase angle means, coupled to said receiver means, for determining a function of the phase angle of each bit of said modulated signal at periodic time intervals;

phase error means, coupled to said phase angle means, for determining and storing a function of the phase error (PE), said phase error being the difference between the phase angle (Ax) of a first bit and the phase angle (Ay) of a second bit of said modulated signal; and demodulation means, coupled to said phase angle and phase error means, for demodulating said signal by comparing the phase angle (Ai) of a selected information bit (l) to the phase angle (Ar) of a reference bit and by adjusting for D times the phase error, wherein D is the number of bits separating the selected information bit from the reference bit;

said demodulation means including means for calculating:

$$\cos(A_i - A_r) \cos(D \cdot PE) + \sin(A_i - A_r) \sin(D \cdot PE),$$

the result of which is indicative of the logical state of bit l of the modulated signal.

8. The receiver of claim 7, wherein said phase error means includes:

means for calculating: $\cos A_y \cos A_x + \sin A_y \sin A_x$, the result of which is $\cos(A_y - A_x)$; and means for calculating: $\sin A_x \cos A_y - \cos A_x \sin A_x$, the result of which is $-\sin(A_y - A_x)$.

9. The receiver of claim 8, wherein said phase error means includes:

means for calculating: $\cos\{D \cdot \cos^{-1}[\cos(PE)]\}$, the result of which is $\cos(D \cdot PE)$; and means for calculating: $\sin\{D \cdot \sin^{-1}\sin(PE)]\}$, the result of which is $\sin(D.PE)$.

10. The receiver of claim 7, wherein said demodulation means includes:

means for calculating: $\cos A_i \cos A_r + \sin A_i \sin A_r$, the result of which is $\cos(A_i - A_r)$; and means for calculating: $\cos A_i \sin A_r - \cos A_r \sin A_i$, the result of which is $-\sin(A_i - A_r)$.

11. The receiver of claim 10, wherein said phase error means includes:
means for calculating: $\cos A_y \cos A_x + \sin A_y \sin A_x$, the result of which is $\cos(A_y - A_x)$; and
means for calculating: $\sin A_x \cos A_y - \cos A_x \sin A_y$, the result of which is $-\sin(A_y - A_x)$.

12. The receiver of claim 11, wherein said phase error means includes:
means for calculating:
$\cos\{D \cos^{-1}[\cos(PE)]\}$, the result of which is $\cos(D \cdot PE)$; and means for calculating:
$\sin\{D \cdot \sin^{-1}[\sin(PE)]\}$, the result of which is $\sin(D \cdot PE)$.

* * * * *